United States Patent [19]

Hollins

[11] 3,828,744
[45] Aug. 13, 1974

[54] INTERNAL COMBUSTION ENGINE CRANK CASE OIL VAPOR CONDENSING MEANS

[76] Inventor: Jesse R. Hollins, 40 Stoner Ave., Great Neck, N.Y. 11521

[22] Filed: Apr. 19, 1973

[21] Appl. No.: 352,699

[52] U.S. Cl. ..................... 123/119 B, 123/41.86
[51] Int. Cl. ................. F02m 25/06, F02f 9/00
[58] Field of Search .............. 123/119 B, 41.86

[56] References Cited
UNITED STATES PATENTS

| | | | |
|---|---|---|---|
| 2,991,775 | 7/1961 | Schrader | 123/119 B |
| 3,073,293 | 1/1963 | Barker | 123/119 B |
| 3,087,474 | 4/1963 | Catha | 123/119 B X |
| 3,236,216 | 2/1966 | Van Dolah | 123/119 B |
| 3,533,385 | 10/1970 | Bennett | 123/119 B |
| 3,620,197 | 11/1971 | Albright et al. | 123/119 B |
| 3,664,314 | 5/1972 | Lamkin | 123/119 B |

Primary Examiner—Charles J. Myhre
Assistant Examiner—Tony Argenbright

[57] ABSTRACT

A motor vehicle having an internal combustion engine which includes a fuel-air intake manifold and an oil crank case. Means is provided for transferring emissions from the oil crank case to the fuel/air intake manifold and while so transferring the emissions cooling the same. Some of the oil vapors in the emissions, as a result of being cooled, condense and form oil driblets which are accumulated and returned to the oil crank case.

1 Claim, 1 Drawing Figure

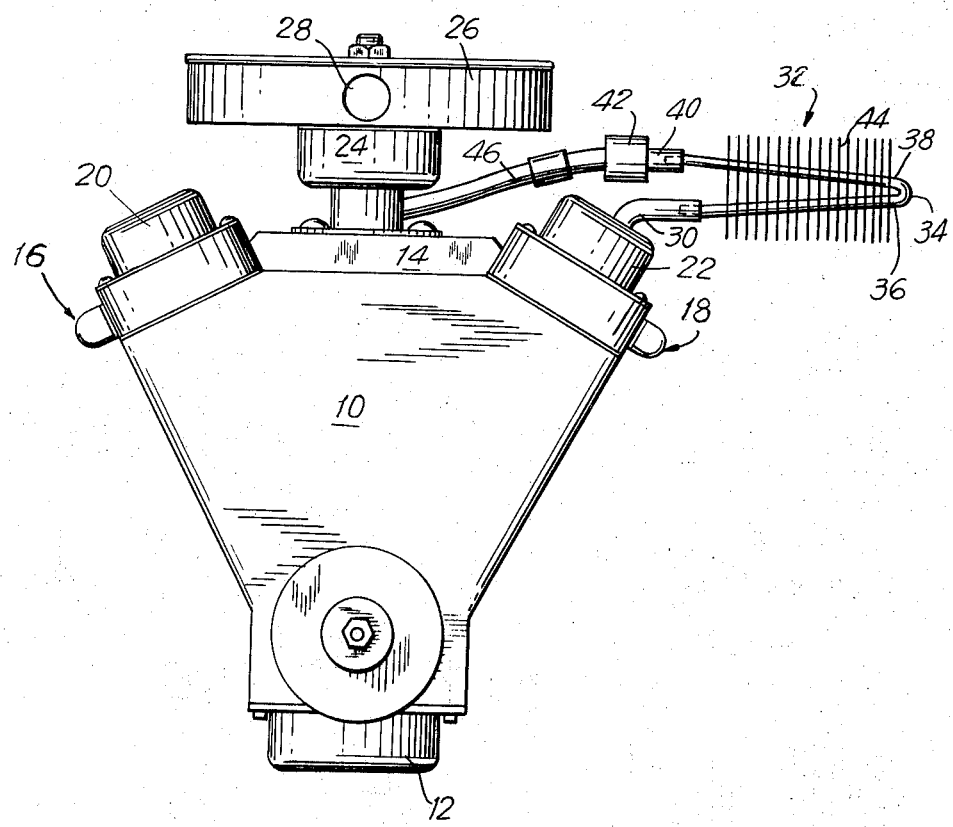

INTERNAL COMBUSTION ENGINE CRANK CASE OIL VAPOR CONDENSING MEANS

BACKGROUND OF THE INVENTION

1. Field of the Invention

Apparatus for cooling the oil vapors of an internal combustion engine and for minimizing the transfer of oil vapors to the fuel/air intake manifold of said internal combustion engine 2. Description of the Prior Art Most motor vehicles utilize internal combustion engines as a source of power. All of the internal combustion engines mix fuel and air in a prescribed ratio which mixture is combusted. As a result of the combustion of the fuel/air mixture, the temperature of the engine block is elevated. Every engine block is provided with a cooling means which circulates a fluid therethrough for cooling purposes. While in most cases the cooling fluid is a liquid, in some instances the cooling fluid is air. There are other parts of the engine which cannot be cooled by the cooling fluid and are cooled and lubricated by lubricating oil. Examples of such parts of an internal combustion engine are bearings, cams, gears, valve stem ends, valve rocker arms, valve springs, crank shafts, connecting rods, etc. An oil circulating pump is provided for circulating oil to the aforedescribed moving parts.

In order to reduce air pollution, the crank case emissions are now drawn into the combustion engine cylinders instead of being directed to atmosphere. This is accomplished by having a tube transfer the crank case emissions to the fuel/air intake manifold either directly or to some part of the internal combustion engine from where they are transferred to the fuel/air intake manifold. As the crank case emissions rise they are drawn into the tube and transferred to the fuel/air intake manifold and combine with the fuel/air mixture.

When the internal combustion engine is started, it is essential that the vacuum created by movement of the piston and cylinders be maintained and thus the tube transferring crank case emissions to the fuel/air intake manifold has to be blocked until sufficient vacuum in the fuel/air intake manifold is developed. This occurs after the engine is running. Thus, a valve is installed in the tube which opens only when the pressure in said tube drops below a specified amount which occurs when the engine is running. The valve is commonly known as the P.C.V. valve.

When automobile manufacturers first started directing crank case emissions to the fuel/air intake manifold, the internal combustion engines then being utilized were designed to operate on gasoline having a high octane rating. The lead additives in the high octane gasoline reduced the temperature of the burning fuel which in turn reduced the heat emitted by the burning fuel and the carbon residue of the burned fuel was limited. Thus, combustion engines were able to operate efficiently for thousands of miles without major overhauls and, specifically, without valve grinding and valve replacement. Since the internal combustion engines operated at a relatively low temperature, oil vapors were not produced in excessive amounts.

Motor vehicle manufacturers are now building internal combustion engines that are designed to operate on low octane rated fuels with less lead additives than used in the past or with no lead additives. As a consequence, these internal combustion engines burn fuel at higher temperatures than in the past and the internal combustion engines operate at higher temperatures than in the past. A natural result of this is that the lubricating oil reaches a higher temperature than in the past resulting in more oil vapors than in the past. Thus, there is an increased amount of oil vapors combined with the fuel/air mixture in the intake manifold. Since the oil vapors directed to the combustion cylinders are not as combustible as the fuel/air mixture, carbonization of the piston heads, valve heads, valve seats and spark plug electrodes increases. As a consequence, there is increased misfiring of the spark plug electrodes, loss of cylinder compression through excessively carbonized valves causing valve leaking with loss of engine power and rough engine operation. In addition, there is an increase in the emission of unburned fuel. The inevitable result of the foregoing is frequent spark plug replacement, valve grinding, cylinder head and cylinder compression chamber cleaning.

A further result of having the internal combustion engine operate at elevated temperatures and the forming of increased amounts of oil vapors is that the P.C.V. valve more readily become contaminated.

SUMMARY OF THE INVENTION

PURPOSES OF THE INVENTION

It is an object of the present invention to provide in a motor vehicle having an internal combustion engine wherein the crank case emissions are transferred to the fuel/air intake manifold means for minimizing the transfer of the oil vapors in the crank case emissions to the fuel/air intake manifold.

Other objects of the invention in part will be obvious and in part will be pointed out hereinafter.

BRIEF DESCRIPTION OF THE INVENTION

According to the present invention the foregoing and other objects are achieved in a motor vehicle having an internal combustion engine with a tube communicating the space below a valve cover of said internal combustion engine with the intake manifold of said internal combustion engine. A condenser is provided for cooling said tube so that the oil vapors which pass therethrough are cooled and form oil driblets which adhere to the inside walls of the tube. When sufficient oil driblets are formed, they become oil droplets. The tube is oriented so that the oil droplets drip back through the valve corner. As a result, the quantity of oil vapors transferred to the air filter housing is minimized.

The invention accordingly consists in the features of construction, combination of elements, and arrangement of parts which will be exemplified in the internal combustion engine oil vapor cooling apparatus hereinafter described and of which the scope of application will be indicated in the appended claims.

BRIEF DESCRIPTION OF THE DRAWING

In the drawings the FIGURE is a schematic illustration of the present invention.

DESCRIPTION OF THE PREFERRED EMBODIMENT

In the FIGURE an internal combustion engine 10 is shown as being a V-type engine. It is to be appreciated that this is for purposes of illustration as the principles of the present invention can be used with other types of internal combustion engines, as for example, with straight-line engines. As is conventional, internal combustion engine 10 includes a crank case 12 and a fuel/air intake manifold 14. Emissions exhaust manifolds 16 and 18 are provided. A valve cover 20 is located over engine head 11. In a similar fashion, a valve cover 22 is located over the engine head. Each valve cover communicates with the oil crank case 12. Located above fuel/air intake manifold 14 is a carburetor 24 and located thereabove is an air filter housing 26. An air inlet tube 28 is in communication with air filter housing 24.

A tube 30 extends through valve cover 22 and is in communication with the space immediately therebelow. A condenser 32 is formed by a V-shaped tube 34, which tube includes a first section 36 and a second section 38. One end of first section 36 of tube 34 is in fluid communication with tube 30 and the other end thereof is at a slightly higher elevation than the end which is in communication with tube 30. Second section 38 of tube 34 includes two ends with one end extending away from the end of first section 36 spaced from tube 30. The remaining end of second section 38 of tube 34 is connected to a tube 40 which is in communication with P.C.V. valve 42. It is to be appreciated that the end of second section 38 of tube 34 which is connected to tube 40 is at a higher elevation than the end of said section which extends to first section 36 of tube 34. Heat radiating fins 44, of conventional design, are secured to sections 36 and 38 of tube 34. While each fin is shown in the drawings connected to both of sections 36 and 38 of tube 34, it is obvious that if desired separate fins can be provided for first section 36 of tube 34 and separate fins provided for second section 38 of tube 34.

A tube arrangement 46 connects P.C.V. valve 42 to the carburetor neck.

During operation of internal combustion engine 10, oil vapors are formed which rise to the area under valve cover 22 and valve cover 20. In addition, due to the necessary clearance between the cylinder walls and pistons therein a certain portion of the products of combustion blow past the piston rings, enter the crank case and rise to a position beneath valve cover 22 and valve cover 20. The combustion products and oil vapors pass through tube 30 into condenser 32. A substantial portion of the oil vapors are cooled in condenser 32 and being condensed they form oil driblets which adhere to the wall of tube 34. When sufficient driblets are formed, the driblets become oil droplets and as a result of the orientation of sections 36 and 38 of tube 34 the oil droplets flow back into tube 30 through valve cover 22 and return into crank case. The combustion products and the oil vapors which do not form oil driblets pass through tube 40, P.C.V. valve 42 and through tube 46 for recycling. The beneficial result of the present invention is that a minimum amount of oil vapors are passed through the P.C.V. valve so that contamination thereof is reduced.

Condenser 42 can be located anywhere in the engine compartment when there is sufficient flow of cooling air.

As a result of the foregoing invention, the amount of oil vapors directed to the combustion cylinders is minimized so that carbonization of the piston heads, valve heads and seats and the spark plug electrodes is minimized. The amount of misfiring of the spark plug electrodes and loss of cylinder compression through unevenly leaking valves and loss of engine power is minimized. The need for spark plug replacement, valve grinding and cylinder compression chamber cleaning is reduced.

If desired another condenser can be provided which is tube attached to valve cover 20 and operates as the first condenser.

Tube 46 can be connected to air filter 26 if desired.

It thus will be seen that there is provided an internal combustion engine oil vapor condensing apparatus which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

I claim:

1. A system comprising an internal combustion engine, said internal combustion engine including a fuel/air intake manifold, an oil crank case, a PCV valve, a valve cover in communication with said oil crank case, a tube extending through said valve cover and in communication with the space immediately therebelow, a condensor formed by a V-shaped tube which includes a first section and a second section, said first section including a first end and a second end, said second end of said first section being at a higher elevation than said first end of said first section, said first end of said first section being in communication with said tube extending through said valve cover, said second section including a first end and a second end, said first end of said second section being at a higher elevation than said second end of said second section, said second end of said first section and said second end of said second section being connected to each other, heat conducting fins connected to said first and second sections, means connecting said first end of said second section to said PCV valve, and means connecting said PCV valve to the fuel/air intake manifold whereby oil vapors are condensed in said first and second sections forming oil driblets which by gravity are returned to the oil crank case.

* * * * *